3,429,920
PREPARATION OF OXIME
Abraham H. de Rooij, Geleen, Netherlands, assignor to
 Stamicarbon N.V., Heerlen, Netherlands
Filed Nov. 23, 1964, Ser. No. 413,134
Claims priority, application Netherlands, Nov. 27, 1963,
301,053
U.S. Cl. 260—566    6 Claims
Int. Cl. C07c 131/00; B01d 11/00; C01b 25/26

ABSTRACT OF THE DISCLOSURE

A process for producing an oxime by reacting a hydroxylamine with an aldehyde or ketone in the presence of a buffering agent which is a mixture of a weak acid having a dissociation constant of $2 \times 10^{-1}$ to $10^{-6}$ and a soluble salt of said weak acid. The resulting oxime is separated from the reaction product and the dissolved weak acid salt is separated from the weak acid, the latter being recycled to the reaction zone. The reaction can be conducted in a plurality of stages, the first being maintained at a pH ranging between 1–2, the final at no greater than 5.

---

Figure 1:
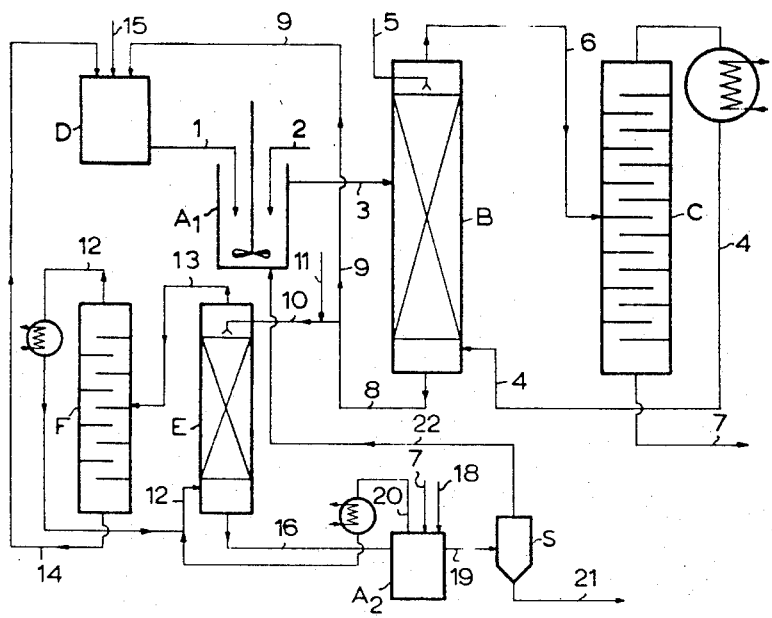

The present invention relates to the preparation of oximes by reacting a hydroxylamine salt solution with an organic compound containing a carbonyl group.

It is known that by reacting an aldehyde or ketone with an aqueous solution of a hydroxylamine salt, e.g., the hydrochloric or sulphuric salt, an oxime can be prepared together with the liberation of an acid according to the reaction equation:

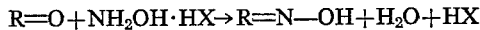

in which R=O represents the aldehyde or ketone, which may be aliphatic, alicyclic, or aromatic, and HX represents an acid, being neutralized by the continuous addition of a neutralizing agent, usually $NH_3$.

This method of producing oximes has certain disadvantages in that the formation of the oxime is always combined with the formation of a salt of the neutralized acid. In many cases, however, the production of such salts is no longer attractive. For instance, ammonium sulphate, which was a popular nitrogen fertilizer only some dozens of years ago, is at present hardly salable at a reasonable price. To continue the production of oximes according to such conventional procedures would require expenditures necessary for neutralizing agents without benefit of realizing any significant return from the product of neutralization. It is therefore an object of the present invention to provide a novel and advantageous process of preparing oximes.

Another object of the present invention is to provide a process for the production of oximes from aliphatic, alicyclic as well as aromatic compounds with a carbonyl group, such as aldehyde or ketones in which, in addition to the oxime, no salt, or much less than in the process customary so far, is obtained as a secondary product.

It has now been found that these objects can be achieved by allowing the acid formed in the reaction between the compound containing the carbonyl group and the hydroxylamine salt solution to remain in solution as such but—as a high conversion to oxime necessitates the reaction mixture ultimately showing a faintly acid to neutral reaction (in general the pH of the reaction mixture will then have to be at least 4.5)—certain measures are taken to eliminate or reduce the strongly pH-reducing influence of the acid liberated.

To this end, the oxime formation is, according to the invention, effected in one or more stages in a buffered medium.

The buffering action is obtained by providing the reaction mixture with a weak inorganic or organic acid with a dissociation constant of $2 \times 10^{-1}$ to $10^{-6}$ and a sufficient amount of a soluble salt (preferably the salt of said weak acid derived from ammonia or hydroxylamine) necessary for obtaining the buffering capacity. After completion of the oxime forming reaction and following the recovery of the oxime a separation is effected between the dissolved salt and the acid and the latter can be used in the hydroxylamine synthesis process.

In general, in order to effect a substantially complete conversion to oxime, the pH of the reaction mixture during the last part of the conversion should be in the region of 4.5 to 6.0.

The realization of the reaction in series-connected stages is preferred because it enables the oxime reaction to be carried out at an increasing pH, so that, as compared with a one stage process, very little ammonia suffices to reach the desired final pH of about 4.5 to 6.0.

In a first stage, the oxime formation is effected at a relatively low pH of 1–2, the conversion efficiency that can be obtained being at least 80%. In the next stage or stages, the reaction is continued and finally completed at a pH of about 4.5.

Performance of the reaction in series-connected stages is particularly suitable if the oxime reaction is effected in a buffered medium consisting of a solution of a salt of a weak acid and this weak acid and if the weak acid has a relatively high dissociation constant, e.g., a dissociation constant equal to, or exceeding, $10^{-3}$. According to a preferred embodiment of the invention, the acid liberated in the oxime reaction is separated off and subsequently reused to form a hydroxylamine salt solution with the hydroxylamine obtained in the hydroxylamine synthesis. This hydroxylamine salt solution can then be refused for the oxime preparation. Suitable hydroxylamine synthesis that may be utilized are, for instance, the known syntheses in which hydroxylamine is formed by the catalytic reduction of NO or $HNO_3$ with hydrogen in an acid medium, or by the electrolytic reduction of $HNO_3$, or by the reduction of nitroparaffins.

For the oxime preparation according to the instant invention representative suitable weak organic and inorganic acids are those characterized in that they (1) exhibit a degree of dissociation of $2 \times 10^{-1}$ to $10^{-6}$, (2) form soluble salts with $NH_3$ and soluble hydroxylamine salts, (3) do not change the nature of the compound which (a) contains the carbonyl group and (b) which is to be converted or (4) which do not change the nature of the resulting oxime by a chemical reaction.

Acids with a degree of dissociation higher than $2 \times 10^{-1}$ generally become less desirable for practical application in proportion as their degree of dissociation increases, since a sufficiently high pH at which the oxime reaction still has a reasonable efficiency can then be reached only with very large amounts of the soluble salt. Acids with a degree of dissociation lower than $10^{-6}$ are ordinarily less desirable since the pH of the medium obtained with these acids and the soluble salts will be so high that the hydroxylamine will decompose.

The preferred acids that may be used include those acids which are readily obtainable and consequently relatively cheap, such as, e.g., phosphoric acid, ammonium bisulphate, formic acid, acetic acid, lactic acid, citric acid, benzene sulphonic acid.

The separation between the oxime produced and the solution containing the acid formed may be effected in various ways. One method is to use so low a temperature that the major part of the oxime crystallizes, and then to separate the crystals from the mother liquor.

The oxime reaction may also be carried out at so high a temperature that the oxime formed, in the molten state, floats as a liquid layer on the aqueous solution containing the acid, after which the two liquid layers are separated from each other in a conventional way. If so desired, the oxime may be extracted from the reaction medium with a suitable organic solvent, e.g., an aliphatic, alicyclic, or aromatic hydrocarbon, to effect a separation between the oxime and the aqueous solution containing the acid. Organic solvents that can be employed are, for instance, cyclohexane, and benzene. The organic solvent can already be added during the oxime formation, so that the reaction can be carried out at a temperature at which the oxime would crystallize out if the solvent were not present. The separation of the oxime by means of extraction is particularly suitable if the acid in solution is dissolved to a considerable extent by the molten oxime, which can be the case when organic acids are used. The extraction of the oxime with an organic solvent can also be used in combination with another method of separation, e.g., first separating the oxime as much as possible as solid oxime or as a liquid upper layer an then extracting the oxime still in solution from the aqueous solution with the aid of the organic solvent. In a preferred embodiment of the instant invention wherein the acid liberated remains in circulation and is used for binding the hydroxylamine produced in the hydroxylamine synthesis, some acid will usually get lost owing to the salt formation with ammonia which is formed as a secondary product in some hydroxylamine syntheses. To obtain a sufficiently high final pH value, it is sometimes also necessary to add some ammonia to the reaction medium, thereby converting some acid to salt. The amounts of salt formed in this way are separated from the circulating acid solution and discharged while a corresponding amount of fresh acid is added.

Figure 2:
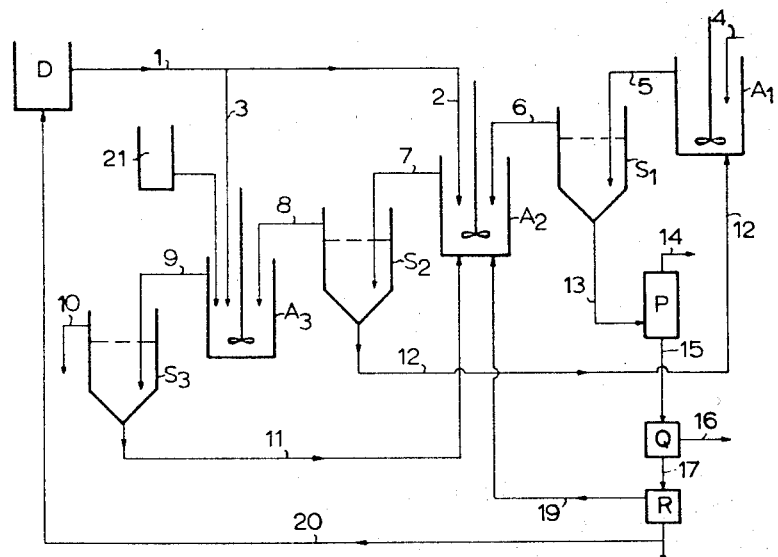
Figure 3:
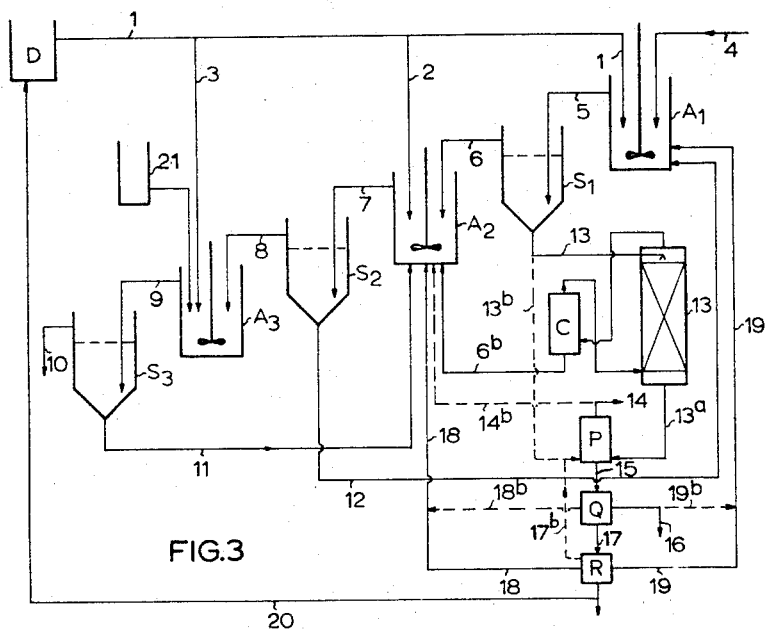

The oxime preparation according to the present invention will be further described with reference to the figures wherein FIG. 1 schematically illustrates a one-stage process of the production of oxime in a medium buffered by a weak organic acid and its salt, e.g., ammonium acetate and acetic acid, the resulting oxime being separated from the aqueous solution containing acid by extraction;

FIG. 2 schematically illustrates a two-stage process for the production of oxime in a medium buffered by a weak organic acid and its salt, e.g., phosphoric acid and primary ammonium phosphate, the resulting oxime being separated from the aqueous solution containing acid in the molten state; and FIG. 3 schematically illustrates a three-stage process for the production of an oxime, the pH being 1–2 in the first stage, about 3 in the second stage, and about 4.5 in the third stage, the process being conducted in a medium buffered by a mixture of primary phosphate and phosphoric acid or by means of a mixture of ammonium sulphate and ammonium bisulphate.

Referring now to FIG. 1, a hydroxyl ammonium-acetate solution containing ammonium acetate and acetic acid is fed from the hydroxylamine-synthesis reactor D through conduit 1 to the oxime reactor $A_1$, the aldehyde or ketone being supplied through conduit 2. The reaction mixture containing oxime flows through conduit 3 into the extraction column B, in which it is extracted with cyclohexane supplied through conduit 4, while water is fed into the top of column B through conduit 5. The cyclohexane containing oxime is passed through conduit 6 into distillation column C, in which the cyclohexane is recovered as a top product and recycled through conduit 4, while the oxime is discharged as a bottom product through conduit 7.

The aqueous solution of ammonium acetate and acetic acid obtained from extraction column B, which solution also contains a little hydroxylammonium acetate, is discharged through conduit 8 and returned mainly to the hydroxylamine-synthesis reactor D through conduit 9. Part of the solution, containing an amount of ammonium acetate corresponding to the amount of ammonium acetate formed as a secondary product in the hydroxylamine synthesis, is passed through conduit 10 to extraction column E. In addition, sulphuric acid is admitted to conduit 10 through conduit 11 to convert the dissolved ammonium acetate into ammonium sulphate and acetic acid. The solution is extracted in column E with diethyl ether supplied from distillation column F through conduit 12.

The ether containing acetic acid, discharged from extraction column E through conduit 13, is distilled in distilaltion column F. The bottom product, the acetic acid, may be either discharged as such, or passed through conduit 14 to hydroxylamine-synthesis reactor D to bind the ammonia and the hydroxylamine formed in this reactor by reduction of NO or $HNO_3$ supplied through conduit 15.

The aqueous solution discharged from the bottom of column E, which solution is freed of acetic acid and contains substantially ammonium sulphate and, in addition, a little free sulphuric acid, hydroxylammonium sulphate, and ether, is passed through conduit 16 into reactor $A_2$, in which, by means of $NH_3$ and aldehyde or ketone supplied through conduits 17 and 18, respectively, the hydroxylamine sulphate is converted to oxime and the sulphuric acid to ammonium sulphate. The ether entrained by the solution evaporates during this reaction. This ether is added, through conduit 20, to the ether discharged from the top of column F through conduit 12. The reaction mixture flowing from reactor $A_2$ is passed to separator S through conduit 19, the upper layer of molten oxime being passed to the oxime reactor $A_1$ through conduit 22 while the bottom layer of ammonium solution is passed to an evaporator (not shown) through conduit 21. Any aldehyde or ketone, still in solution, at this point can be recovered by evaporation.

Referring to FIG. 2, the oxime formation is effected in two, series connected, reactors $A_2$ and $A_3$, each of which is provided with a separator, $S_2$ and $S_3$, in which the oxime formed is separated as a top layer from the underlying water layer. The reservoir $A_1$, with its separator $S_1$, serves to extract any oxime still in solution from the water layer discharged from separator $S_2$ through conduit 12, the aldehyde or ketone to be converted to oxime being added to reservoir $A_1$ as the extracting agent through conduit 4. The mixture contained in reservoir $A_1$ flows through conduit 5 into separator $S_1$, where it forms two layers. The supernatant layer of aldehyde or ketone flows through conduit 6 into the oxime reactor $A_2$. Furthermore, a solution of hydroxylammonium phosphate, primary ammonium phosphate, and phosphoric acid is fed to reactor $A_2$ from the hydroxylamine-synthesis reactor D through conduits 1 and 2. The temperature in reactor $A_2$ is such that the oxime formed remains liquid. Into reactor $A_2$ there is also introduced from separator $S_3$ through conduit 11 the water layer formed therein which is substantially a solution of primary ammonium phosphate. Additionally into reactor $A_2$ there is introduced through conduit 19 part of the moist crystal mass of primary ammonium phosphate from crystallizer R. The amounts of reactant and reagents supplied to reactor $A_2$ are such that the pH of the reaction mixture therein is between about 1.8–2. The reaction mixture from reactor $A_2$ flows into separator $S_2$ through conduit 7. The top layer in separator $S_2$ contains oxime and also a little unconverted aldehyde or ketone and is passed into oxime reactor $A_3$ through conduit 8. Reactor $A_3$ also receives some hydroxylammonium phosphate, which is supplied through conduit 3. A pH of 4.5 is maintained in reactor $A_3$ by addition of ammonia water from reservoir 21.

The reaction mixture from reactor $A_3$ flows through conduit 9 into separator $S_3$, where it forms two layers. The top layer of oxime is discharged through conduit 10 as the product.

The water layer, formed in separator $S_1$, which is a solution of primary ammonium phosphate and phosphoric acid, is passed into evaporator P through conduit 13. Water vapor escapes through conduit 14. The concentrated solution obtained in evaporator P is supplied to crystallizer Q through conduit 15 where primary ammonium phosphate is crystallized by cooling and discharged as a secondary product through conduit 16. The remaining liquid is passed through conduit 17 into crystallizer R, where it is cooler further. The primary ammonium phosphate crystals formed in crystallizer R are recycled through conduit 19 to reactor $A_2$. The remaining mother liquor containing mainly phosphoric acid is passed through conduit 20 into the hydroxylamine-synthesis reactor D, where it binds the hydroxylamine produced in this reactor to form hydroxylammonium phosphate.

Referring now to FIG. 3, the oxime reaction is effected in three, series-connected, reactors $A_1$, $A_2$ and $A_3$. The amount of oxime formed in each reactor is separated as a liquid top layer from the aqueous bottom layer in the separators $S_1$, $S_2$ and $S_3$ associated with the reactors.

A hydroxylammonium phosphate solution, which also contains primary ammonium phosphate and phosphoric acid, is supplied from the hydroxylamine-synthesis reactor D through conduit 1.

Furthermore, the water layer containing primary ammonium phosphate and phosphoric acid in separator $S_2$ is removed through conduit 12, and primary ammonium phosphate from crystallizer R is supplied through conduit 19, to reactor $A_1$ in amounts sufficient that the pH in reactor $A_1$, is adjusted to between about 1.8–2.0. Conduit 4 supplies, for instance, cyclohexanone to reactor $A_1$. The reaction mixture, in which 95% of the oxime has already formed, flows through conduit 5 from reactor $A_1$ into separator $S_1$. The top layer formed in separator $S_1$ consists essentially of molten oxime and a little unreacted cyclohexanone. This mixture flows through conduit 6 into reactor $A_2$, where a further formation of oxime is effected, after addition thereto of some hydroxylammonium phosphate through conduit 2 and of some primary ammonium phosphate from crystallizer R through conduit 18. Further, the oxime obtained by extraction in column B from the aqueous solution from separator $S_1$ is supplied to reactor $A_2$ through conduit 6b as well as the water layer separated off in separator $S_3$ through conduit 11. The total reaction mixture in reactor $A_2$ has a pH of about 3. The reaction mixture is passed into separator $S_2$ through conduit 7. The top layer of molten oxime with a little unreacted cyclohexanone is passed into reactor $A_3$ through conduit 8. Also supplied to reactor $A_3$ are some more hydroxylammonium phosphate, through conduit 3, and ammonia water from reservoir 21 in an amount sufficient that the pH in the reactor $A_3$ is about 4.5. At this pH, the conversion to oxime is virtually complete (efficiency 99.5%). The mass in which the reaction has been completed is passed into separator $S_3$ through conduit 9. The top layer of molten oxime is discharged as oxime product through conduit 10. The aqueous solution of ammonium phosphate is recycled to the preceding reactor $A_2$ through conduit 11. The water layer formed in separator $S_1$, which, unlike the aqueous solutions discharged from separators $S_2$ and $S_3$, contains, besides ammonium phosphate and phosphoric acid, some dissolved oxime due to the low pH thereof. It is therefore fed into the top of extraction column B through conduit 13 where it is extracted with, for instance, benzene, which takes up the dissolved oxime. The oxime-laden benzene is passed into the evaporator C through conduit 13c, the evaporated benzene being returned into the bottom of extraction column B through conduit 13d. The oxime left in the evaporator C is passed into reactor $A_2$ through conduit 6b.

The aqueous solution, freed of oxime and discharged from the bottom of extraction column B, is passed into evaporator P through conduit 13a. The resulting water vapor, with traces of benzene, escapes through conduit 14. The concentrated solution formed in evaporator P is passed through conduit 15 into crystallizer Q, where it is so cooled that primary ammonium phosphate crystals are formed. These crystals are discharged through conduit 16 in an amount corresponding to the amount of $NH_3$ produced in the hydroxylamine synthesis in a similar period of time. If so desired, the crystals of primary ammonium phosphate discharged through conduit 16 can be converted to ammonium nitrate and phosphoric acid by means of nitric acid, thereafter the ammonium nitrate and the phosphoric acid can be separated with, e.g., butanol as an extracting agent and the phosphoric acid thus obtained can be returned to the hydroxylamine synthesis. Hydroxylammonium phosphate is prepared during the hydroxylamine synthesis by reduction of $HNO_3$ or NO in a phosphoric-acid medium. Also during this synthesis some ammonium phosphate is formed since, besides the hydroxylamine, ammonia is always produced. The mother liquor from crystalizer Q is passed through conduit 17 into crystallizer R, where again an amount of primary ammonium phosphate crystallizes out at a lower temperature. These crystals are recycled through conduits 18 and 19, respectively, to reactors $A_2$ and $A_1$, also respectively. The remaining solution containing mainly phosphoric acid can be either discharged as such or passed through conduit 20 into the hydroxylamine-synthesis reactor D.

When the oxime preparation is effected in a medium buffered by ammonium sulphate and ammonium bisulphate, this can in principle be done in the same way. Since much less oxime appears to dissolve in the water layer formed in separator $S_1$, the extraction of oxime from this water layer can be omitted, the water layer from separator $S_1$ being fed into evaporator P through conduit 13b. Due to the low solubility of ammonium sulphate, it is necessary to recycle part of the water vapor obtained from evaporator P to reactor $A_2$ through conduit 14b.

The concentrated suspension of ammonium sulphate crystals obtained from evaporator P is separated from the mother liquor in crystallizer Q, part of the crystals being discharged as a secondary product conduit 16, while the remainder is recycled through conduits 18b and 19b to reactors $A_2$ and $A_1$, respectively.

The mother liquor from crystallizer Q is passed through conduit 17 into crystallizer R, where it is cooled further and mixed crystals of the composition $(NH_4)_3H(SO_4)_2$ are formed. These mixed crystals are returned to evaporator P through conduit 17b. The solution from crystallizer R containing mainly ammonium bisulphate can be either discharged as such or fed into hydroxylamine-synthesis reactor D to bind hydroxylamine formed in this reactor.

EXAMPLE 1

In a process for the preparation of oxime in a medium buffered by acetic acid-acetate, carried out in accordance with the schematic illustration shown in FIG. 1, reactor $A_1$, for instance, receives per unit time, through conduit 12, 3.89 moles of cyclohexanone and through conduit 1, a solution containing:

| | Moles |
|---|---|
| $CH_3COOH$ | 12 |
| $NH_2OH.CH_3COOH$ | 4.3 |
| $CH_3COONH_4$ | 4.0 |
| $H_2O$ | 100 |

Through conduit 22 there is also introduced as recycle into reactor A, a solution containing 0.1 mole of oxime and 0.01 mole of unreacted cyclohexanone. The product of the reaction which is passed into extraction column B contains:

| | Moles |
|---|---|
| $CH_3COOH$ | 15.9 |
| $NH_2OH.CH_3COOH$ | 0.4 |
| $CH_3COONH_4$ | 4.0 |
| Oxime | 4.0 |
| $H_2O$ | 103.9 |

This mixture is extracted with cyclohexane in an amount of 53.5 moles, which moreover contains 0.08 mole of CH$_3$COOH. 28.1 moles of H$_2$O are fed into the top of extraction column B.

The extract containing oxime is separated in distillation column C and drawn off as the bottom product. 4.0 moles of oxime are thus obtained.

The solution flowing from the bottom of extraction column B is discharged through conduit 8 and split up in a 3:1 ratio. One part, containing

| | Moles |
|---|---|
| CH$_3$COOH | 11.93 |
| NH$_2$OH.CH$_3$COOH | 0.3 |
| CH$_3$COONH$_4$ | 3.0 |
| H$_2$O | 99.0 | is passed directly to the hydroxylamine-synthesis reactor D via conduit 9, the other part, containing

| | Moles |
|---|---|
| CH$_3$COOH | 3.97 |
| NH$_2$OH.CH$_3$COOH | 0.1 |
| CH$_3$COONH$_4$ | 1.0 |
| H$_2$O | 33.0 | is passed to extractor E via conduit 10 extracted with ether (35.6 moles of ether and 1.95 moles of water). Simultaneously 0.605 mole of sulphuric acid are added to the extraction column E to effect a separation between the acetic acid in solution and the ammonium sulphate and the hydroxylammonium sulphate.

The ether extract containing acetic acid is passed to distillation column F via conduit 13 where it is distilled to produce a bottom product consisting of 5.07 moles of acetic acid which is then passed into the hydroxylamine-synthesis reactor via conduit 14. The top product of the distillation column F consists essentially of ethyl ether and some water and is returned to extraction column E via conduit 12. A solution consisting of

| | Moles |
|---|---|
| (NH$_2$OH)$_2$.H$_2$SO$_4$ | 0.05 |
| (NH$_4$)$_2$SO$_4$ | 0.5 |
| H$_2$SO$_4$ | 0.055 |
| H$_2$O | 33.0 |
| Ether | 0.36 | is discharged from the bottom of extraction column E via conduit 16.

This bottoms solution is passed into reactor A$_2$ to convert the hydroxylamine with added cyclohexanone (0.11 mole) to oxime, while the free acid is bound to ammonium sulphate with 0.21 mole of NH$_3$. The reaction mixture is passed into separator S. The bottom layer from separator S contains 0.605 mole of (NH$_4$)$_2$SO$_4$ and 33.1 moles of H$_2$O, and is discharged via line 21 and evaporated. The top layer from separator S contains 0.1 mole of oxime and 0.01 mole of cyclohexanone and is passed into oxime reactor A$_1$.

In this way 0.605 mole of ammonium sulphate is produced per unit time and per 4 moles of oxime produced. Thus only 0.15 mole of ammonium sulphate per mole of oxime are produced according to the instant invention as opposed to 0.6 mole of ammonium sulphate per mole of oxime according to conventional processes, it being assumed that also in such conventional processes 0.25 mole of NH$_3$ is produced per mole of hydroxylamine in the hydroxylamine synthesis.

EXAMPLE 2

In a process for the preparation of oxime in a medium buffered by phosphoric acid-phosphate, carried out in accordance with the schematic illustration shown in FIG. 3, reactor A$_1$ receives per unit time, through conduit 4, 90 moles of cyclohexanone, and, through conduit 1, a solution consisting of:

| | Moles |
|---|---|
| NH$_2$OH.H$_3$PO$_4$ | 94.6 |
| NH$_4$H$_2$PO$_4$ | 47.3 |
| H$_3$PO$_4$ | 23.65 |
| H$_2$O | 946 | and, through conduit 12, a solution mainly consisting of:

| | Moles |
|---|---|
| NH$_2$OH.H$_3$PO$_4$ | 0.4 |
| NH$_4$H$_2$PO$_4$ | 18.85 |
| H$_3$PO$_4$ | 7.2 |
| H$_2$O | 68 | and, through conduit 19, a moist crystal mass consisting of:

| | Moles |
|---|---|
| NH$_4$H$_2$PO$_4$ | 37.0 |
| H$_2$O | 4.75 |

The pH of the reaction mixture in reactor A$_1$ is between about 1.8–2.0. The reaction mixture is subsequently passed into separator S$_1$ through conduit 5. A top layer of mainly molten oxime and consisting of:

| | Moles |
|---|---|
| H$_3$PO$_4$ | 1.5 |
| Cyclohexanone | 5.0 |
| Oxime | 79.0 |
| H$_2$O | 30 | is passed into reactor A$_2$ via conduit 6. This reactor A$_2$ furthermore receives, through conduit 2, a solution consisting of:

| | Moles |
|---|---|
| NH$_2$OH.H$_3$PO$_4$ | 5.0 |
| NH$_4$H$_2$PO$_4$ | 2.5 |
| H$_3$PO$_4$ | 1.25 |
| H$_2$O | 50 | through conduit 11, a solution mainly consisting of:

| | Moles |
|---|---|
| NH$_2$OH.H$_3$PO$_4$ | 0.05 |
| NH$_4$H$_2$PO$_4$ | 0.75 |
| H$_2$O | 16.35 | through conduit 18, a moist crystal mass consisting of:

| | Moles |
|---|---|
| NH$_4$H$_2$PO$_4$ | 15.6 |
| H$_2$O | 2 | and, through conduit 6b, 6 moles of oxime. The pH of the reaction mixture in reactor A$_2$ is about 3. The reaction mixture is then passed into separator S$_2$ via conduit 7 where again two layers are formed. The top layer, consisting mainly of molten oxime, flows into reactor A$_3$ through conduit 8. This stream of oxime contains:

| | Moles |
|---|---|
| H$_3$PO$_4$ | 0.2 |
| Cyclohexanone | 0.35 |
| Oxime | 89.65 |
| H$_2$O | 35 |

Also fed into reactor A$_3$ through conduit 3, are

| | Moles |
|---|---|
| NH$_2$OH.H$_3$PO$_4$ | 0.4 |
| NH$_4$H$_2$PO$_4$ | 0.2 |
| H$_3$PO$_4$ | 0.1 |
| H$_2$O | 4 | and, from reservoir 21, ammonia water (0.55 mole of NH$_3$, 2 moles of H$_2$O). The pH of the reaction mixture in reactor A$_3$ is 4.5.

The reaction mixture is thereafter passed into separator S$_3$ via conduit 9. The top layer, consisting of 90 moles of molten oxime and 4.5% by weight of moisture, is discharged from separator S$_3$ via conduit 10.

The solution discharged from the bottom of separator S$_1$ through conduit 13 and consisting of:

| | Moles |
|---|---|
| Oxime | 6.0 |
| NH$_2$OH.H$_3$PO$_4$ | 10.0 |
| NH$_4$H$_2$PO$_4$ | 103.15 |
| H$_3$PO$_4$ | 114.35 |
| H$_2$O | 1073.75 | is extracted with 130 moles of benzene in extraction column B, in which extraction the oxime is taken up by the benzene. The oxime-laden benzene which is led from extraction column B via conduit 13c to evaporator C is separated in said evaporator C into benzene, which is returned via conduit 13d into the extraction column, and oxime, which is passed into reactor $A_2$ via conduit 6b. The solution freed of oxime and discharged from extraction column B is passed through conduit 13a into evaporator P, from where 365 moles of $H_2O$ are discharged as water vapor through conduit 14. The evaporated solution is cooled to 25° C. in crystallizer Q, as a result of which 20.55 moles of $NH_4H_2PO_4$ crystallize out, which are discharged through conduit 16. The mother liquor is passed to crystallizer R via conduit 17 and is cooled therein to 0° C. As a result, 52.6 moles of $NH_4H_2PO_4$ crystallize out, the crystals being recycled to reactors $A_2$ and $A_1$ through conduits 18 and 19, respectively. The remaining mother liquor consisting of

| | Moles |
|---|---|
| $NH_2OH \cdot H_3PO_4$ | 10 |
| $NH_4H_2PO_4$ | 30 |
| $H_3PO_4$ | 114.35 |
| $H_2O$ | 698 | is passed into the hydroxylamine-synthesis reactor through conduit 20. Consequently, 0.23 mole of $NH_4H_2PO_4$ is obtained as a secondary product per mole of oxime produced, 0.2 mole being due to the secondary production of $NH_3$ in the hydroxylamine synthesis and only 0.03 mole being caused by the ammonia water used in the oxime preparation.

EXAMPLE 3

In a process for the preparation of oxime in a medium buffered by bisulphate-sulphate, carried out in accordance with the schematic illustration shown in FIG. 3, reactor $A_1$ receives, through conduit 4, 160 moles of cyclohexanone, and, through conduit 1, a solution from hydroxylamine-synthesis reactor D and consisting of:

| | Moles |
|---|---|
| $NH_2OH \cdot NH_4HSO_4$ | 160 |
| $(NH_4)_2SO_4$ | 62.4 |
| $NH_4HSO_4$ | 80 |
| $H_2O$ | 2432 | through conduit 12, a solution mainly consisting of:

| | Moles |
|---|---|
| $NH_2OH \cdot NH_4HSO_4$ | 13 |
| $(NH_4)_2SO_4$ | 160 |
| $NH_4HSO_4$ | 32 |
| $H_2O$ | 1297 | through conduit 19, a moist crystal mass consisting of:

| | Moles |
|---|---|
| $(NH_4)_2SO_4$ | 195.6 |
| $H_2O$ | 107.5 |

The pH of the reaction mixture in reactor $A_1$ is 1.8. The reaction mixture is passed into separator $S_1$ via conduit 5. A top layer of mainly molten oxime and consisting of:

| | Moles |
|---|---|
| $NH_4HSO_4$ | 2 |
| Cyclohexanone | 27 |
| Oxime | 143 |
| $H_2O$ | 22 | is passed into reactor $A_2$ via conduit 6. This reactor furthermore receives, through conduit 2, a solution consisting of:

| | Moles |
|---|---|
| $NH_2OH \cdot NH_4HSO_4$ | 30 |
| $(NH_4)_2SO_4$ | 11.7 |
| $NH_4HSO_4$ | 15 |
| $H_2O$ | 456 | through conduit 11, a solution mainly consisting of:

| | Moles |
|---|---|
| $NH_2OH \cdot NH_4HSO_4$ | 1.02 |
| $(NH_4)_2SO_4$ | 20.9 |
| $H_2O$ | 236 | through conduit 18, a moist crystal mass consisting of:

| | Moles |
|---|---|
| $(NH_4)_2SO_4$ | 127.4 |
| $H_2O$ | 70 |
| $H_2O$ (through conduit 14b) | 560 |

The pH of the reaction mixture in reactor $A_2$ is 3. The reaction mixture is then passed into separator $S_2$, where two layers are formed.

The top layer of mainly molten oxime is passed into reactor $A_3$ through conduit 8. This flow of oxime contains:

| | Moles |
|---|---|
| $NH_4HSO_4$ | 3 |
| Cyclohexanone | 9 |
| Oxime | 161 |
| $H_2O$ | 65 |

Also fed to reactor $A_3$, through conduit 3, are

| | Moles |
|---|---|
| $NH_2OH \cdot NH_4HSO_4$ | 10 |
| $(NH_4)_2SO_4$ | 3.9 |
| $NH_4HSO_4$ | 5 |
| $H_2O$ | 152 | and, from reservoir 21, ammonia water (17 moles of $NH_3$, 65 moles of $H_2O$). The pH of the reaction mixture in reactor $A_3$ is 4.5. The reaction mixture is subsequently passed into separator $S_3$, where it is split up into a top layer of molten oxime and an aqueous bottom layer. The top layer consisting of 170 moles of oxime and 55 moles of $H_2O$ is discharged as the product via conduit 10. The aqueous bottom layer is passed into reactor $A_2$ through conduit 11.

The aqueous layer discharged from the bottom of separator $S_1$ via conduit 13 is a solution consisting of:

| | Moles |
|---|---|
| $NH_2OH \cdot NH_4NSO_4$ | 30 |
| $(NH_4)_2SO_4$ | 418 |
| $NH_4HSO_4$ | 253 |
| $H_2O$ | 3957.5 |

In addition, the solution contains 0.1% by weight of oxime, which is too little to be removed by extraction. Without being extracted, the solution is passed through conduit 13b into evaporator P, from which 1120 moles of water are discharged as water vapor through conduit 14 and 560 moles of water are passed into reactor $A_2$ through conduit 14b. The evaporated solution is freed of crystals in crystallizer Q, a crystal suspension of 18.5 moles of $(NH_4)_2SO_4$ and 10.2 moles of $H_2O$ being discharged through conduit 16. A crystal suspension consisting of 195.6 moles of $(NH_4)_2SO_4$ and 107.5 moles of $H_2O$ are passed into reactor $A_1$ through conduit 19b and 19, and a crystal suspension of 127.4 moles of $(NH_4)_2SO_4$ and 70 moles of $H_2O$ are passed into reactor $A_2$ through conduit 18b and 18. The remaining mother liquor is passed through conduit 17 into crystallizer R, where it is cooled further to about 15° C. Here mixed crystals of $(NH_4)_2SO_4$ and $NH_4HSO_4$ are formed.

These crystals are separated off in an amount of 200 moles of $(NH_4)_3H(SO_4)_2$ and 137 moles of $H_2O$ and returned to evaporator P through conduit 17b.

A solution consisting of:

| | Moles |
|---|---|
| $NH_2OH \cdot NH_4HSO_4$ | 30 |
| $(NH_4)_2SO_4$ | 76.5 |
| $NH_4HSO_4$ | 253 |
| $H_2O$ | 2089.5 | is passed through conduit 20 into hydroxylamine synthesis reactor D, into which also 18.5 moles of $H_2SO_4$ and 4.5 moles of $H_2O$ are fed.

Consequently, only 0.11 mole of ammonium sulphate is obtained as a secondary product per mole of oxime produced.

EXAMPLE 4

Oxime was also prepared from butanone in a medium buffered by phosphoric acid-phosphate in virtually the same way as indicated in Example 2. Here the oxime reaction proceeds to 77% in the first stage at a pH of 2, to 95% in the second stage at a pH of 3, and is completed in the third stage at a pH of 4.5. 0.27 mole of primary ammonium phosphate had to be discharged from the system per mole of oxime produced.

What is claimed is:

1. A process for the preparation of an oxime which comprises:
    (1) reacting a hydroxylamine salt solution with a member selected from the group consisting of butanone and cyclohexanone in the presence of a buffering medium comprising a weak acid selected from the group consisting of phosphoric acid, ammonium bisulfate, formic acid, acetic acid, lactic acid, citric acid and benzene sulphonic acid and at least one soluble salt of said weak acid to produce said oxime;
    (2) separating the oxime from the reaction mixture containing said weak acid formed during the reaction and soluble salt of said weak acid;
    (3) separating said weak acid from said soluble salt of said weak acid in the remaining reaction mixture;
    (4) passing said separated weak acid to a zone wherein said hydroxylamine salt solution is formed; and
    (5) reacting said weak acid with hydroxylamine to form said hydroxylamine salt solution.
2. The process of claim 1 wherein the oxime in step (2) is solvent extracted with an organic solvent to separate the oxime from the reaction mixture.
3. The process of claim 2 wherein the remaining reaction mixture of step (3) is solvent extracted with a poorly water-miscible organic solvent in which said weak acid dissolves to separate said weak acid from the remaining reaction mixture.
4. The process of claim 2 wherein the remaining reaction mixture of step (3) is cooled sufficiently to crystallize out said soluble salt of said weak acid from the remaining reaction mixture.
5. The process of claim 1 wherein the reaction of hydroxylamine salt solution with said member in step (1) is carried out in a first and final series-connected stages, maintaining the pH of the reaction mixture at 1–2 in the first reaction stage and maintaining the pH of the reaction mixture between 4.5–6.0 in the final reaction stage.
6. The process of claim 5 which includes adding to any of said reaction stages a compound showing alkaline reaction.

References Cited

UNITED STATES PATENTS

| 2,820,825 | 1/1958 | Hillyer et al. | 260—566 |
| 3,070,627 | 12/1962 | Bostian et al. | 260—566 |

FOREIGN PATENTS

| 677,386 | 8/1952 | Great Britain. |
| 520,400 | 6/1963 | Belgium. |
| 374,783 | 6/1962 | Japan. |

FLOYD D. HIGEL, *Primary Examiner.*

U.S. Cl. X.R.

23—103, 106, 120, 165, 190, 193; 260—705